US012578062B2

(12) United States Patent
Li et al.

(10) Patent No.: US 12,578,062 B2
(45) Date of Patent: Mar. 17, 2026

(54) ANTI-LEAKAGE DEVICE FOR HYDROGEN STORAGE CONTAINER

(71) Applicants: China Special Equipment Inspection & Research Institute, Beijing (CN); Jiangsu Special Equipment Inspection Institute, Nanjing (CN)

(72) Inventors: Xiang Li, Beijing (CN); Jiepu Li, Beijing (CN); Xin Ma, Beijing (CN); Yitao Liu, Beijing (CN)

(73) Assignees: China Special Equipment Inspection & Research Institute, Beijing (CN); Jiangsu Special Equipment Inspection Institute, Nanjing (CN)

( * ) Notice: Subject to any disclaimer, the term of this patent is extended or adjusted under 35 U.S.C. 154(b) by 255 days.

(21) Appl. No.: 18/380,890

(22) Filed: Oct. 17, 2023

(65) Prior Publication Data

US 2024/0142061 A1 May 2, 2024

(30) Foreign Application Priority Data

Oct. 31, 2022 (CN) ........................ 202211348244.X

(51) Int. Cl.
*F17C 13/04* (2006.01)
*F17C 13/12* (2006.01)

(52) U.S. Cl.
CPC .............. *F17C 13/04* (2013.01); *F17C 13/12* (2013.01); *F17C 2205/0111* (2013.01);
(Continued)

(58) Field of Classification Search
CPC .. F17C 13/04; F17C 13/12; F17C 2205/0111; F17C 2205/0323; F17C 2221/012; F17C 2260/037; F17C 2260/036; Y02E 60/32
See application file for complete search history.

(56) References Cited

U.S. PATENT DOCUMENTS 3,570,481 A * 3/1971 Woodberry, Jr. ......... F17C 7/04
128/201.21
6,012,453 A * 1/2000 Tsals ......................... F17C 7/04
128/913

(Continued)

FOREIGN PATENT DOCUMENTS

CN 210567482 U 5/2020
CN 214467850 U 10/2021
WO WO-2018077510 A1 * 5/2018 ................ F17C 1/06

OTHER PUBLICATIONS

Chinese communication, with English translation, dated Mar. 14, 2023 in corresponding Chinese patent application No. 202211348244.X.

*Primary Examiner* — Jessica Cahill
(74) *Attorney, Agent, or Firm* — Nields, Lemack & Frame, LLC

(57) ABSTRACT

Disclosed is an anti-leakage device for a hydrogen storage container. A sealing assembly is connected to a right side of a tank body of an anti-leakage device, an impurity removing assembly is connected to a lower side of the tank body, and the impurity removing assembly is connected to the sealing assembly. By adopting the technical solution above, if the leakage occurs from the hydrogen storage container, hydrogen leaks into an inner cavity of the tank body, and an anti-leakage effect is achieved by intercepting and collecting the hydrogen. With the increase of the amount of hydrogen collected in the inner cavity of the tank body, an air pressure in the tank body increases, and a high-pressure gas pushes a first linkage block and a sealing sleeve to move to the right, making the contact between the sealing sleeve and a first cylinder closer.

12 Claims, 9 Drawing Sheets

(52) U.S. Cl.
CPC ................. *F17C 2205/0323* (2013.01); *F17C 2221/012* (2013.01); *F17C 2260/037* (2013.01)

(56) References Cited

U.S. PATENT DOCUMENTS

| | | | | |
|---|---|---|---|---|
| 2007/0144590 | A1* | 6/2007 | Simmons | G05D 7/0133<br>137/613 |
| 2008/0023493 | A1* | 1/2008 | Lavan | F17C 1/16<br>222/386.5 |
| 2015/0260338 | A1* | 9/2015 | Tsai | F16K 1/303<br>141/348 |
| 2015/0276128 | A1* | 10/2015 | Hulse | F17C 7/04<br>62/45.1 |
| 2019/0107254 | A1* | 4/2019 | Rigdon | F17C 5/06 |

* cited by examiner

ANTI-LEAKAGE DEVICE FOR HYDROGEN STORAGE CONTAINER

CROSS-REFERENCE TO RELATED APPLICATION

This patent application claims the benefit and priority of Chinese Patent Application No. 202211348244.X, filed with the China National Intellectual Property Administration on Oct. 31, 2022, the disclosure of which is incorporated by reference herein in its entirety as part of the present application.

TECHNICAL FIELD

The present disclosure relates to the technical field of leakage proof of hydrogen storage containers. More specifically, the present disclosure relates to an anti-leakage device for a hydrogen storage container.

BACKGROUND

In the existing Chinese patent: an anti-leakage device for a liquid hydrogen storage tank (CN214467850U), two anti-leakage grooves and two rubber rings are provided to seal an inner left side of an anti-leakage pipe, thus effectively avoiding the leakage of liquid hydrogen, and improving the safety of the device. A threaded rod is rotated to drive an anti-leakage sleeve to move up and down to open and close an outlet of the liquid hydrogen storage tank, that is, to replace an ordinary valve for operation. With the increase of service time, the threaded rod is prone to loosening, and is also prone to leakage compared with the ordinary valve. Meanwhile, the existing equipment is unable to recover and reuse the hydrogen that has leaked between the external storage tank and the liquid hydrogen storage tank, leading to waste of hydrogen and certain security risks.

The above matters as background description are only used to enhance understanding of the background of the present disclosure, and should not be construed as an admission that the present disclosure is the prior art known to those skilled in the art.

SUMMARY

An anti-leakage device for a hydrogen storage container is provided by the present disclosure, with an objective of overcoming the defects that the existing equipment is prone to leakage compared with an ordinary valve with the increase of service time and the hydrogen leaked between an external storage tank and a liquid hydrogen storage tank cannot be pumped out.

To achieve the objective above, the technical solution adopted by the present disclosure is as follows:

An anti-leakage device for a hydrogen storage container includes a tank body, a top cover, connecting rings, a hydrogen storage container body, a first pipeline, a valve body, an extension bar, a first sleeve, a hand wheel, a first sealing ring, a sealing assembly, and an impurity removing assembly. The top cover is fixedly connected to an upper side of the tank body, and the first sealing ring is fixedly connected between the tank body and the top cover. Two connecting rings are fixedly connected to an inner side of the tank body. Multiple first grooves are formed in each of the two connecting rings in an annular array. The hydrogen storage container body is fixedly connected between the two connecting rings. The first pipeline communicates with an upper side of the hydrogen storage tank body, the valve body is installed on the first pipeline, and the extension bar is fixedly connected to a flexible shaft of the valve body. The first sleeve is fixedly connected to an upper left part of the tank body, and the first sleeve is hermetically and rotatably connected to the extension bar. The hand wheel is fixedly connected to a left side of the extension bar, and the sealing assembly is connected to a right side of the tank body. The impurity removing assembly is connected to a lower side of the tank body, and is connected to the sealing assembly.

As an improvement of the above solution, the sealing assembly includes a second pipeline, a third pipeline, a first cylinder, a piston unit, a fixing unit, a shunting unit, and a blocking unit. A right upper part of the tank body communicates with the second pipeline, and the third pipeline is hermetically connected to a right side of the second pipeline in a sliding manner. The first cylinder is fixedly connected to an inner right part of the second pipeline, the piston unit is connected to an inner side of the first cylinder, the fixing unit is arranged at an outer left part of the second pipeline, the shunting unit is connected to an inner left part of the second pipeline, and the blocking unit is connected to the shunting unit.

As an improvement of the above solution, the piston unit includes a linkage frame, a first linkage block, and a sealing sleeve. The linkage frame is fixedly connected to an inner right part of the third pipeline, the first linkage block is fixedly connected to a left end of the linkage frame, the sealing sleeve is fixedly connected to an outer side of the first linkage block, and the sealing sleeve is in contact with the first cylinder.

As an improvement of the above solution, the fixing unit includes a disc, a circular ring, a shift rod, magnets, fixing blocks, a fixing ring, second linkage blocks, and a second sealing ring. The disc is fixedly connected to an upper right part of the tank body, and the disc is located outside the second pipeline. The circular ring is rotatably connected to a right side of the disc, and the shift rod is fixedly connected to a rear side of the circular ring. Two magnets are fixedly connected inside the circular ring, and the magnet located below is magnetically connected to the shift rod. Four fixing blocks are fixedly connected to an inner side of the circular ring in an annular array. The fixing ring is fixedly connected to an outer left part of the third pipeline, and four second grooves are formed in the fixing ring in an annular array. Four second linkage blocks are fixedly connected to a right side of the fixing ring in an annular array. Each of the second linkage block is provided with an inclined plane, and the second sealing ring is fixedly connected to an inner left part of the disc.

As an improvement of the above solution, the shunting unit includes a spacer, a stopper, a fourth pipeline, and a fifth pipeline. The spacer is fixedly connected to an inner left part of the second pipeline, the stopper is fixedly connected to a left side of the spacer, and the stopper is fixedly connected to the second pipeline. The fourth pipeline penetrates through a middle part of the stopper, and the fourth pipeline is fixedly connected to the tank body. The fifth pipeline communicates with a lower side of the fourth pipeline, and the fifth pipeline is fixedly connected to the tank body. Multiple round holes are formed in an upper side of the fifth pipeline.

As an improvement of the above solution, the blocking unit includes first filter screens and a second filter screen. Multiple first filter screens are fixedly connected between the connecting ring located above and the tank body in an annular array. The fourth pipeline penetrates through the adjacent first filter screen, and the second filter screen is fixedly connected between a front side of the spacer and the second pipeline.

As an improvement of the above solution, the impurity removing assembly includes a first diversion block, a second diversion block, a second sleeve, a third sleeve, a second cylinder, a handle, a third cylinder, an oxygen absorption bag, a connecting block, and a cleaning unit. The first diversion block is fixedly connected to a lower side of the tank body, and an upper side surface of the first diversion block is V-shaped. The second diversion block is fixedly connected to a lower left part of the tank body, and the second diversion block is fixedly connected to the first diversion block. The second sleeve is fixedly connected between the first diversion block and the second diversion block. The third sleeve penetrates through a lower right part of the tank body, and the second cylinder is hermetically connected between the second sleeve and the third sleeve in a sliding manner. The handle is fixedly connected to a right side of the second cylinder. The third cylinder is inserted into an inner side of the second cylinder, and the oxygen absorption bag is placed on an inner side of the third cylinder. The connecting block is screwed to a left side of the third cylinder, and the cleaning unit is connected to a left side of the connecting block.

As an improvement of the above solution, the cleaning unit includes a connecting rod and a push block. The connecting rod is fixedly connected to a left side of the connecting block, and the push block is fixedly connected to a left side of the connecting rod.

As an improvement of the above solution, multiple through holes are formed in a left side of the third cylinder.

As an improvement of the above solution, a third groove is formed in a right lower part of the first diversion block.

The present disclosure has the beneficial effects that by adopting above technical solution, hydrogen is enabled to leak into an inner cavity of the tank body, and an anti-leakage effect is achieved by intercepting and collecting the hydrogen. Afterwards, with the increase of the amount of hydrogen collected in the inner cavity of the tank body, an air pressure in the tank body increases, and a high-pressure gas pushes the first linkage block and the sealing sleeve to move to the right, making the contact between the sealing sleeve and a first cylinder closer. That is, the sealing performance is automatically enhanced with the increase of leaked hydrogen, and a higher sealing and anti-leakage function can be achieved compared with a general high-pressure ball valve.

The problem that the leaked hydrogen cannot be pumped out is solved by pumping out hydrogen collected in the tank body through a third pipeline. Moreover, a situation that the air in the tank body is mixed into the collected hydrogen to cause the reduction of the purity of the hydrogen is avoided by exhausting the air in the tank body.

In the process of exhausting air, the air deposited on the inner lower part of the tank body is dispersed upwards through the fifth pipeline, thus improving the air exhaust efficiency. The impurities going to flow into the second pipeline are intercepted through the second filter screen, thus preventing impurities from being mixed in the pumped hydrogen, and further improving the purity. Oxygen remaining in the tank body is completely removed through the oxygen absorption bag to prevent the oxygen from being mixed in the hydrogen, thus improving the safety performance.

In addition, the oxygen absorption bag can be conveniently replaced by pulling the second cylinder, and when the oxygen absorption bag is pulled out, the push block can be automatically linked to collect the impurities in the tank body into the third groove, and thus the difficulty of manually cleaning the impurities is reduced.

BRIEF DESCRIPTION OF THE DRAWINGS

Contents shown in the accompanying drawings and reference numerals in the drawings are described as follows.

In the drawings.

1—tank body; 2—top cover; 3—connecting ring; 4—hydrogen storage container body; 5—first pipeline; 6—valve body; 7—extension bar; 8—first sleeve; 9—hand wheel; 10—first sealing ring; 201—second pipeline; 202—third pipeline; 203—first cylinder; 204—linkage frame; 205—first linkage block; 206—sealing sleeve; 207—disc; 28—circular ring; 209—shift rod; 2010—magnet; 2011—fixing block; 2012—fixing ring; 2013—second linkage block; 2014—second sealing ring; 2015—spacer; 2016—stopper; 2017—fourth pipeline; 2018—fifth pipeline; 2019—first filter screen; 2020—second filter screen; 301—first diversion block; 302—second diversion block; 303—second sleeve; 304—third sleeve; 305—second cylinder; 306—handle; 307—third cylinder; 308—oxygen absorption bag; 309—connecting block; 3010—connecting rod; 3011—push block; 91—first groove; 92—second groove; 93—through hole; 94—third groove.

DETAILED DESCRIPTION OF THE EMBODIMENTS

The present disclosure is specifically introduced below with reference to accompanying drawings and specific embodiments.

Embodiment 1

Figure 1:
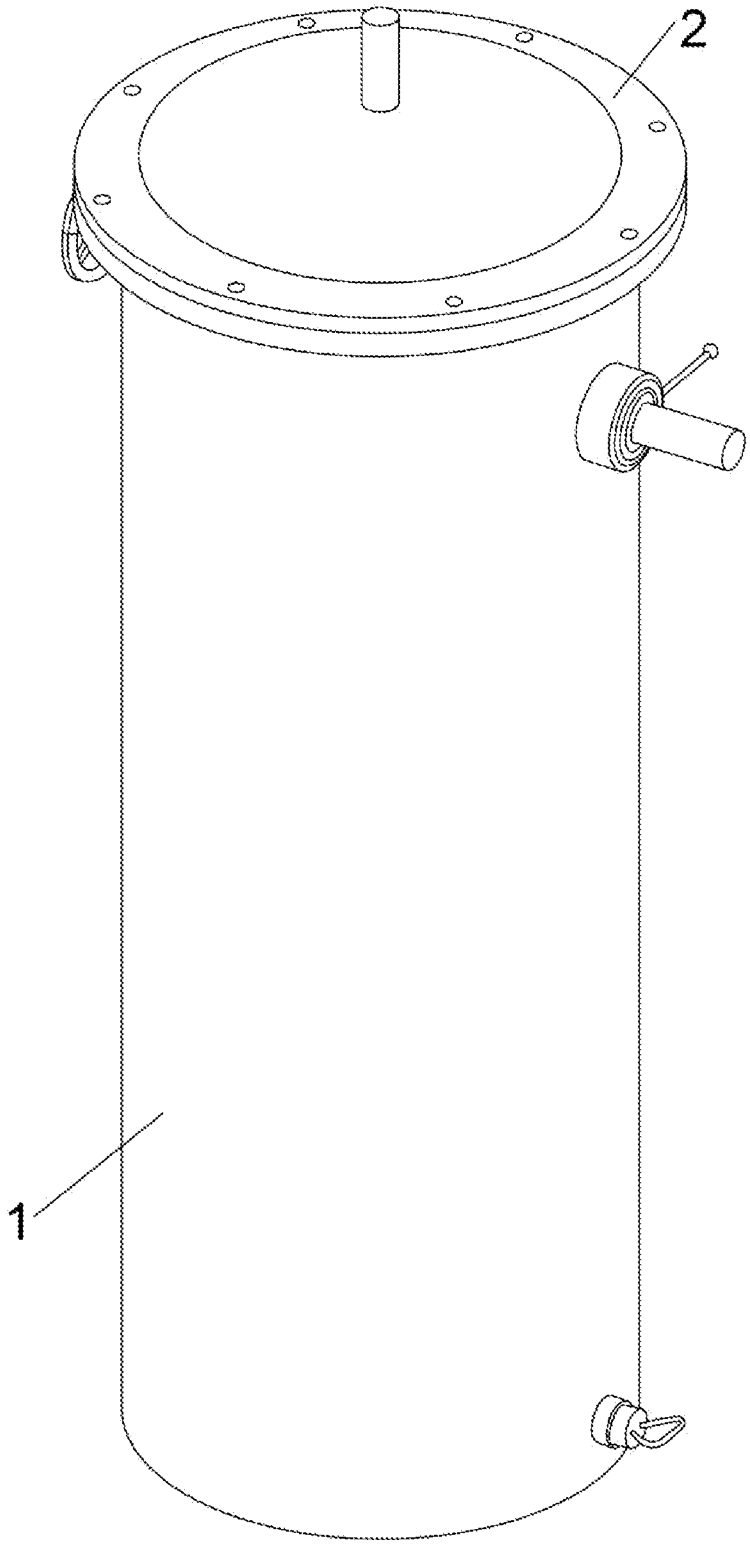
FIG. 1 is a first structural schematic diagram of an anti-leakage device for a hydrogen storage container according to the present disclosure.
Figure 2:
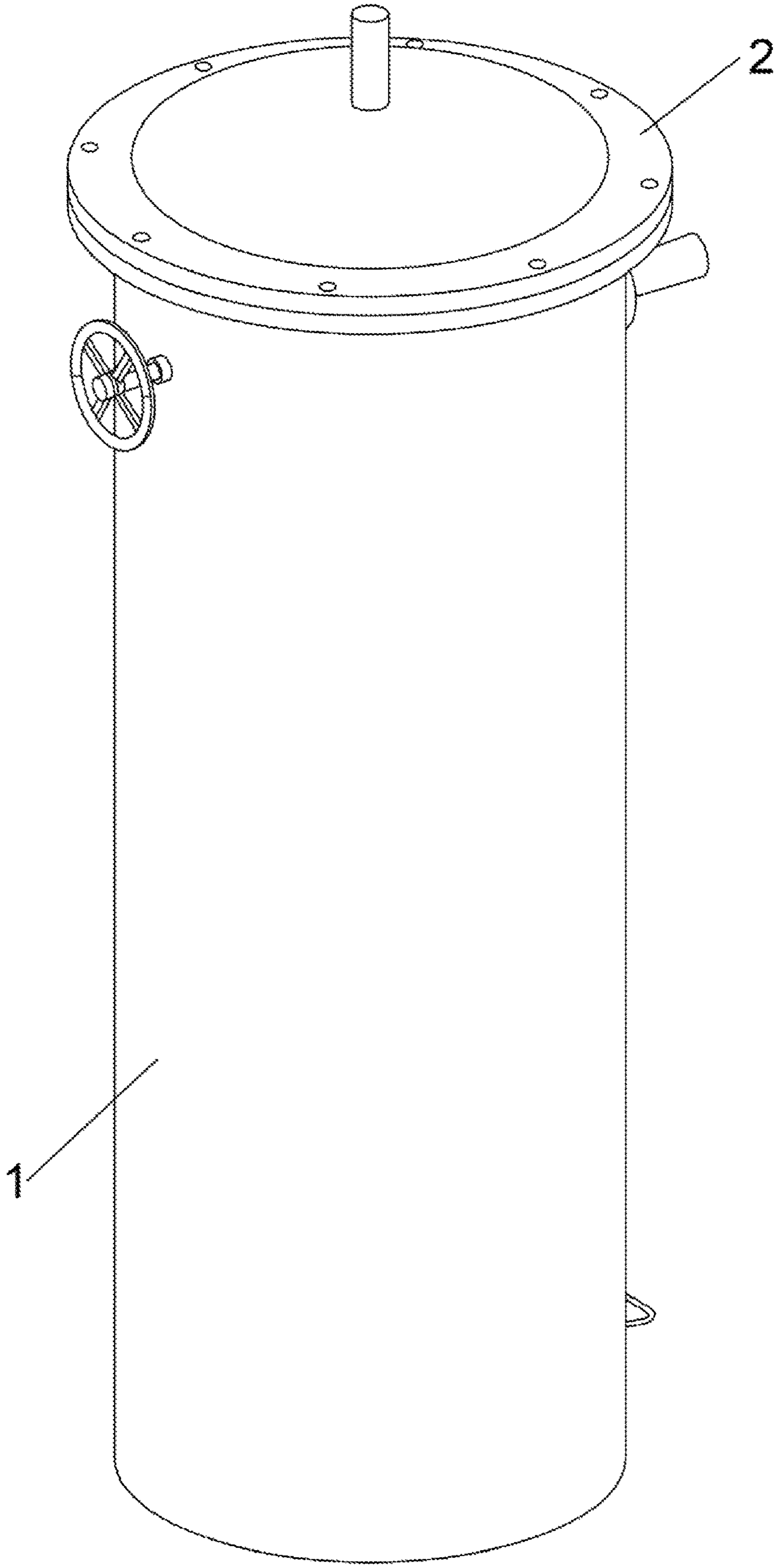
FIG. 2 is a second structural schematic diagram of an anti-leakage device for a hydrogen storage container according to the present disclosure.
Figure 3:
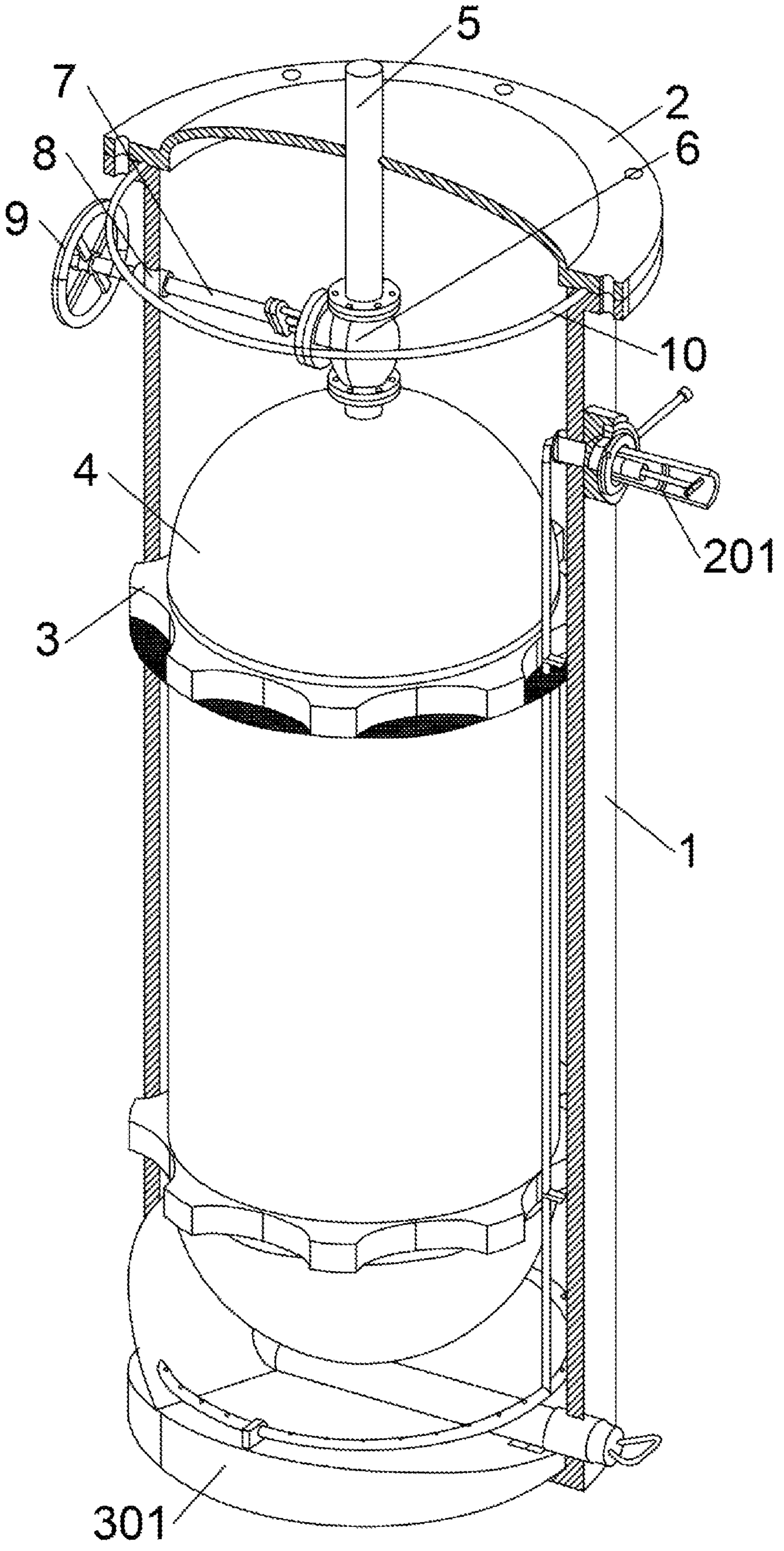
FIG. 3 is a sectional view of an anti-leakage device for a hydrogen storage container according to the present disclosure.
Figure 4:
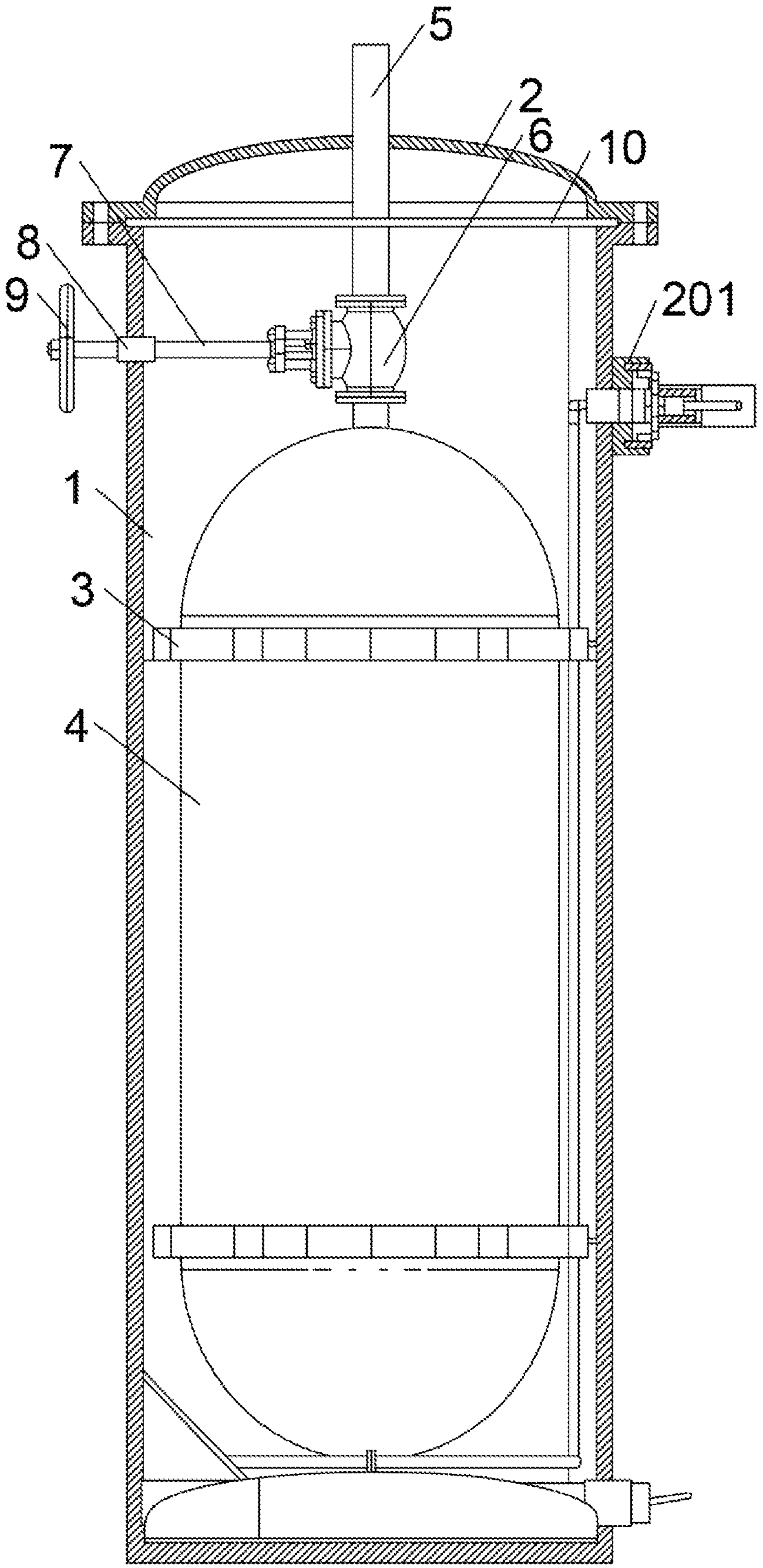
FIG. 4 is a front view of an anti-leakage device for a hydrogen storage container according to the present disclosure.
Figure 5:
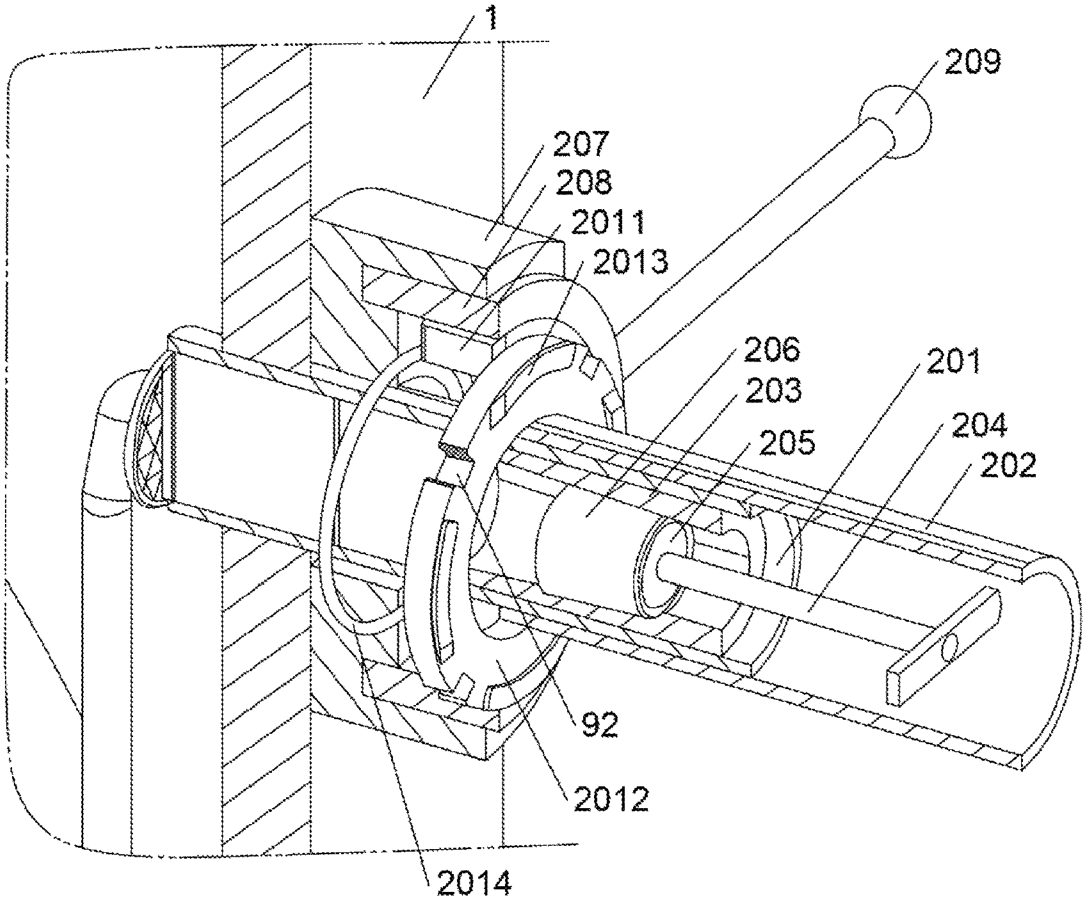
FIG. 5 is a first partial structural schematic diagram of a sealing assembly according to the present disclosure.
Figure 6:
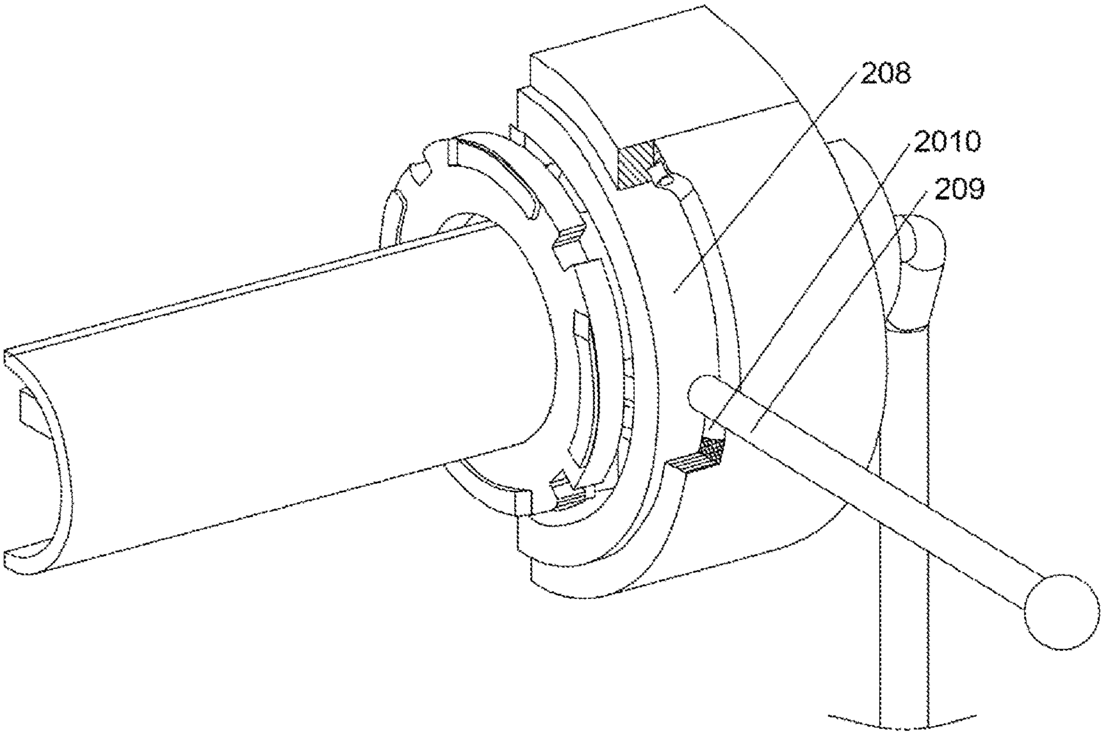
FIG. 6 is a second partial structural schematic diagram of a sealing assembly according to the present disclosure.
Figure 7:
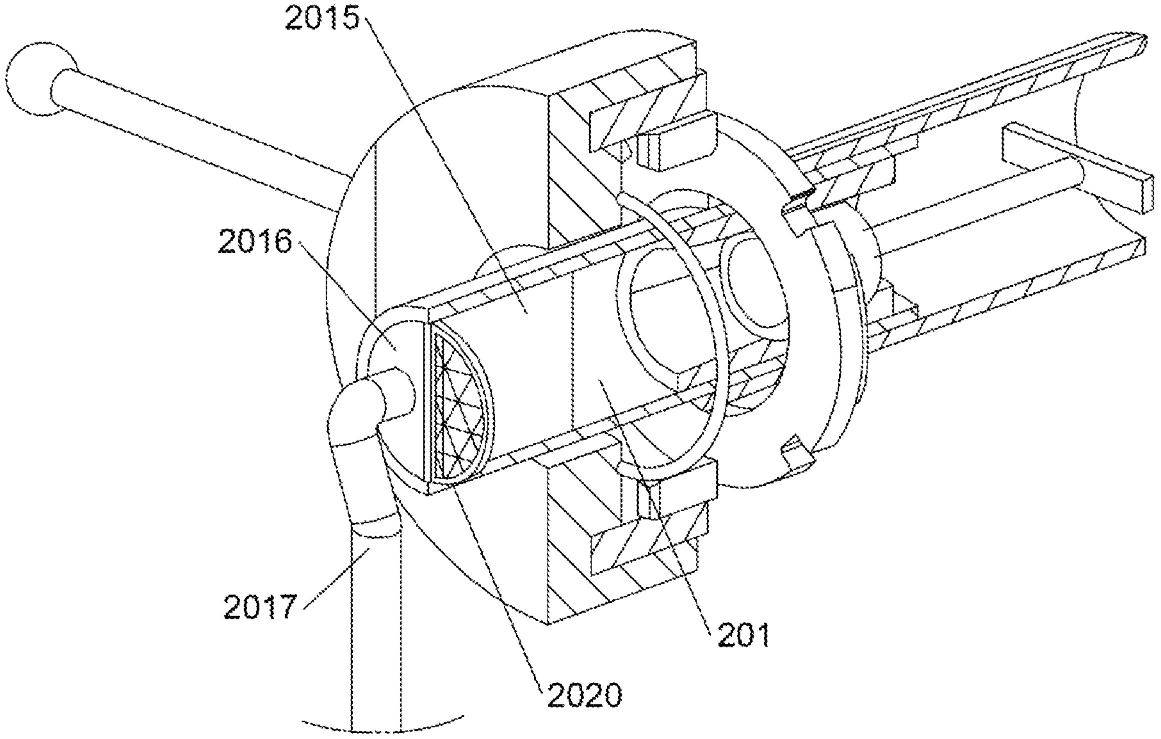
FIG. 7 is a third partial structural schematic diagram of a sealing assembly according to the present disclosure.
Figure 8:
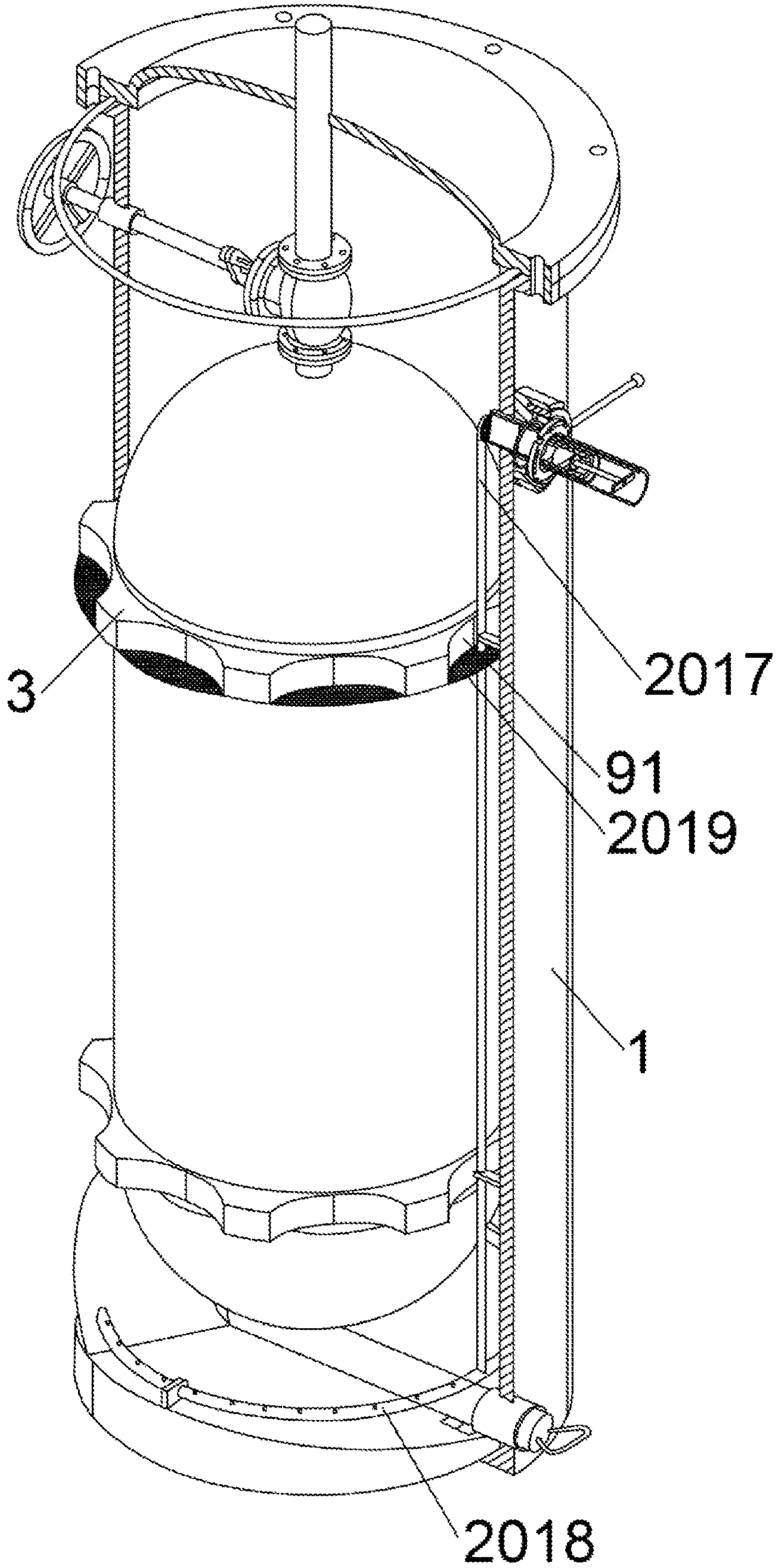
FIG. 8 is a fourth partial structural schematic diagram of a sealing assembly according to the present disclosure.

An anti-leakage device for a hydrogen storage container, as shown in FIG. 1 through FIG. 8, includes a tank body 1, a top cover 2, connecting rings 3, a hydrogen storage container body 4, a first pipeline 5, a valve body 6, an extension bar 7, a first sleeve 8, a hand wheel 9, a first sealing ring 10, a sealing assembly, and an impurity removing assembly. The top cover 2 is bolted to an upper side of the tank body 1, and the first sealing ring 10 is fixedly connected between the tank body 1 and the top cover 2. Two connecting rings 3 are welded to an inner side of the tank body 1. Multiple first grooves 91 are formed in each of the two connecting rings 3 in an annular array. The hydrogen storage container body 4 is fixedly connected between the two connecting rings 3. The first pipeline 5 communicates with an upper side of the hydrogen storage tank body 4, the valve body 6 is installed on the first pipeline 5, and the extension bar 7 is welded to a flexible shaft of the valve body 6. The first sleeve 8 is welded to an upper left part of the tank body 1, and the first sleeve 8 is hermetically and rotatably connected to the extension bar 7. The hand wheel 9 is bolted to a left side of the extension bar 7, and the sealing assembly is connected to a right side of the tank body. The impurity removing assembly is connected to a lower side of the tank body 1, and is connected to the sealing assembly.

The sealing assembly includes a second pipeline 201, a third pipeline 202, a first cylinder 203, a piston unit, a fixing unit, a shunting unit, and a blocking unit. A right upper part of the tank body 1 communicates with the second pipeline 201, and the third pipeline 202 is hermetically connected to a right side of the second pipeline 201 in a sliding manner. The first cylinder 203 is welded to an inner right part of the second pipeline 201, and the piston unit is connected to an inner side of the first cylinder 203. The fixing unit is arranged at an outer left part of the second pipeline 201, the shunting unit is connected to an inner left part of the second pipeline 201, and the blocking unit is connected to the shunting unit.

The piston unit includes a linkage frame 204, a first linkage block 205, and a sealing sleeve 206. The linkage frame 204 is welded to an inner right part of the third pipeline 202, the first linkage block 205 is fixedly connected to a left end of the linkage frame 204, the sealing sleeve 206 is fixedly connected to an outer side of the first linkage block 205, and the sealing sleeve 206 is in contact with the first cylinder 203.

The fixing unit includes a disc 207, a circular ring 208, a shift rod 209, magnets 2010, fixing blocks 2011, a fixing ring 2012, second linkage blocks 2013, and a second sealing ring 2014. The disc 207 is welded to an upper right part of the tank body 1, and the disc 207 is located outside the second pipeline 201. The circular ring 208 is rotatably connected to a right side of the disc 207, and the shift rod 209 is fixedly connected to a rear side of the circular ring 208. Two magnets 2010 are fixedly connected inside the circular ring 208, and the magnet 2010 located below is magnetically connected to the shift rod 209. Four fixing blocks 2011 are welded to an inner side of the circular ring 208 in an annular array. The fixing ring 2012 is welded to an outer left part of the third pipeline 202, and four second grooves 92 are formed in the fixing ring 2012 in an annular array. Four second linkage blocks 2013 are welded to a right side of the fixing ring 2012 in an annular array. Each of the second linkage block 2013 is provided with an inclined plane, and the second sealing ring 2014 is fixedly connected to an inner left part of the disc 207.

The shunting unit includes a spacer 2015, a stopper 2016, a fourth pipeline 2017, and a fifth pipeline 2018. The spacer 2015 is welded to an inner left part of the second pipeline 201, the stopper 2016 is welded to a left side of the spacer 2015, and the stopper 2016 is fixedly connected to the second pipeline 201. The fourth pipeline 2017 penetrates through a middle part of the stopper 2016, and the fourth pipeline 2017 is fixedly connected to the tank body 1. The fifth pipeline 2018 communicates with a lower side of the fourth pipeline 2017, and the fifth pipeline 2018 is fixedly connected to the tank body 1. Multiple round holes are formed in an upper side of the fifth pipeline 2018.

The blocking unit includes first filter screens 2019 and a second filter screen 2020. Multiple first filter screens 2019 are fixedly connected between the connecting ring 3 located above and the tank body 1 in an annular array. The fourth pipeline 2017 penetrates through an adjacent first filter screen 2019; and the second filter screen 2020 is fixedly connected between a front side of the spacer 2015 and the second pipeline 201.

During preparation, a first external conveying pipe is manually connected to the first pipeline 5, a second external conveying pipe is manually connected to the third pipeline 202, and then the shift rod 209 is pushed to move upwards to make contact with the magnet 2010 located above. The magnet 2010 attracts the shift rod 209 by a magnetic force, the shift rod 209 drives the circular ring 208 to rotate by 45°, and then the circular ring 208 drives the fixing block 2011 to make circular motion, enabling the fixing block 2011 to be aligned with the second groove 92 on the fixing ring 2012. Afterwards, the third pipeline 202 is pushed to move to the left to drive the fixing ring 2012 to move to the left to make contact with the second sealing ring 2014, then the shift rod 209 is pushed to move back to its original position, thus enabling the fixing block 2011 to move back to its original position. In this process, a left side surface of the fixing block 2011 is in contact with the inclined plane of the second linkage block 2013, and the fixing block 2011 continues to make circular motion to push the second linkage block 2013 to move to the left; the second linkage block 2013 drives the fixing ring 2012 to move to the left to press the second sealing ring 2014 against the disc 207. Meanwhile, the fixing ring 2012 is locked by the second linkage block 2013, the third pipeline 202 drives the linkage frame 204 to move to the left, the linkage frame 204 drives the first linkage block 205 to move to the left, and the first linkage block 205 drives the sealing sleeve 206 to move to the left for stopping making contact with the first cylinder 203, thus opening the first cylinder 203 to communicate the second pipeline 201 with the third pipeline 202. Afterwards, the air inside the tank body 1 is pumped out through the second external conveying pipe, then nitrogen is injected and then pumped out. The nitrogen is repeatedly injected for three times, and the inside of the tank body 1 is finally pumped to a vacuum state. In this process, partial nitrogen is diverted to the fourth pipeline 2017 by the spacer 2015, then is conveyed to the fifth pipeline 2018 from the fourth pipeline 2017, and flows out from the round holes formed in the fifth pipeline 2018. The air deposited at the inner lower part of the tank body 1 is dispersed upwards, thus improving the air exhaust efficiency. After the air exhaust is completed, the third pipeline 202 is manually moved to its original position, and the third pipeline 202 drives the fixing ring 2012 to move back to the original position. At this time, the left side of the fixing ring 2012 is blocked by the fixing block 2011, and the third pipeline 202 is linked with the sealing sleeve 206 to plug the first cylinder 203 again.

When the hydrogen in the hydrogen storage container body 4 needs to be used, the hand wheel 9 is manually turned, the hand wheel 9 drives the extension bar 7 to rotate to open the valve body 6, and then the hydrogen flows into the external conveying pipe from the first pipeline 5 to complete the hydrogen conveying operation, and then the hand wheel 9 is manually screwed to close the valve body 6.

When leakage occurs, the hydrogen is to leak to an inner cavity of the tank body 1, and the anti-leakage effect is achieved by intercepting and collecting the hydrogen. Afterwards, with the increase of the amount of hydrogen collected in the inner cavity of the tank body 1, an air pressure in the tank body 1 increases, and the high-pressure gas pushes the first linkage block 205 and the sealing sleeve 206 to move to the right, thus making the contact between the sealing sleeve 206 and the first cylinder 203 closer. That is, the sealing performance is automatically enhanced with the increase of leaked hydrogen, and a higher sealing and anti-leakage function can be achieved compared with a general high-pressure ball valve.

When the hydrogen collected in the tank body 1 needs to be pumped out according to equipment maintenance requirements, such as daily inspection or regular inspection, the above operation is repeated to open the first cylinder 203, then the hydrogen collected in the tank body 1 is pumped out through the second external pipe, thus solving the problem that the leaked hydrogen cannot be pumped out. Moreover, a situation that the air in the tank body 1 is mixed into the collected hydrogen to cause the reduction of the purity of the hydrogen is avoided by exhausting the air in the tank body 1.

If such a device is installed on the hydrogen storage container body 4 that has been used for a period of time, the paint or other impurities on a surface of the hydrogen storage container body 4 may fall off into the tank body 1 in the subsequent use process, leading to a situation that impurities are mixed when the hydrogen collected in the tank body 1 is pumped out. In this case, most of the impurities are intercepted at the lower side of the tank body 1 by the first filter screens 2019, and the impurities going to flow into the second pipeline 201 are intercepted by the second filter screen 2020, thus avoiding impurities from being mixed in the pumped hydrogen, and improving the purity.

Embodiment 2

Figure 9:
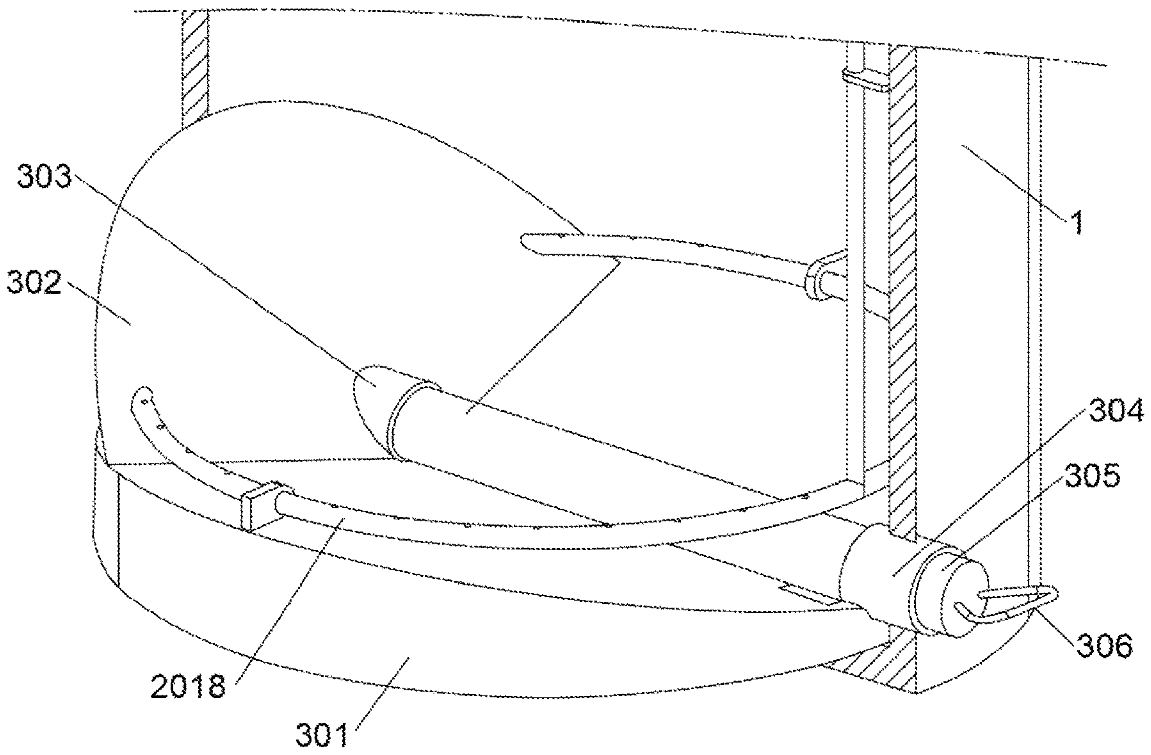
FIG. 9 is a structural schematic diagram of an impurity removing assembly according to the present disclosure.
Figure 10:
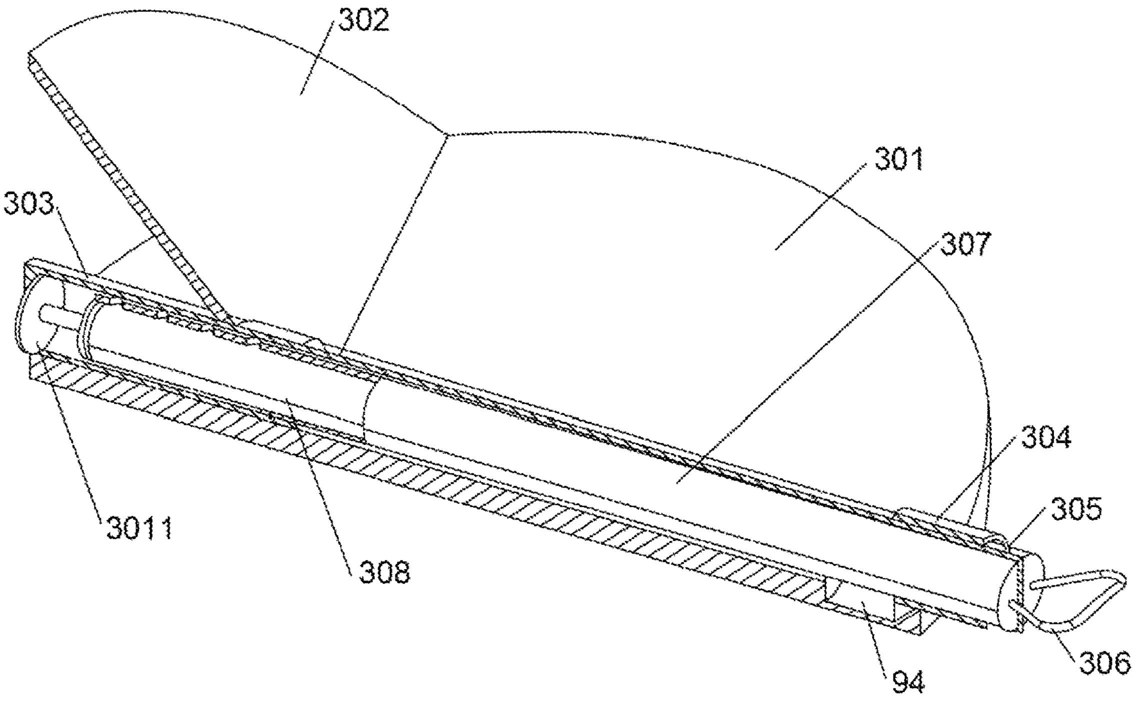
FIG. 10 is a first partial structural schematic diagram of an impurity removing assembly according to the present disclosure.
Figure 11:
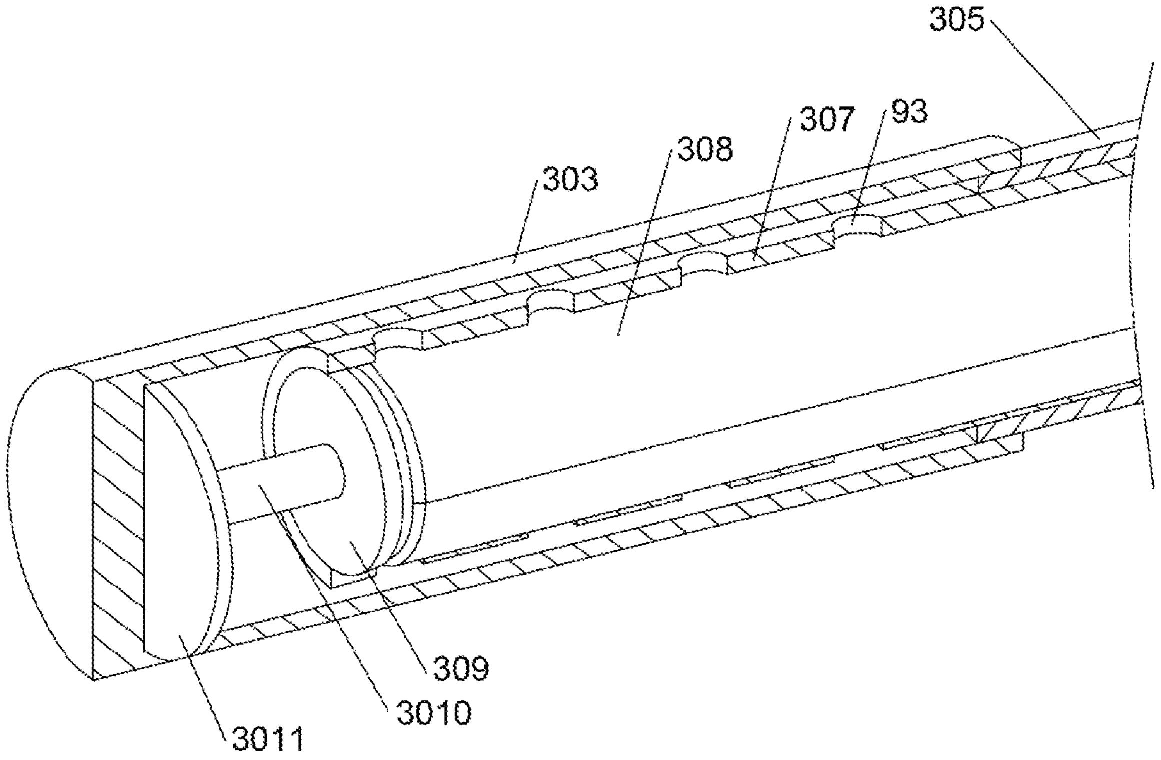
FIG. 11 is a second partial structural schematic diagram of an impurity removing assembly according to the present disclosure.

On the basis of Embodiment 1, as shown in FIG. 1-FIG. 3 and FIG. 9-FIG. 11, the impurity removing assembly includes a first diversion block 301, a second diversion block 302, a second sleeve 303, a third sleeve 304, a second cylinder 305, a handle 306, a third cylinder 307, an oxygen absorption bag 308, a connecting block 309, and a cleaning unit. The first diversion block 301 is welded to a lower side of the tank body 1, and an upper side surface of the first diversion block 301 is V-shaped. The second diversion block 302 is welded to a lower left part of the tank body 1, and the second diversion block 302 is fixedly connected to the first diversion block 301. The second sleeve 303 is fixedly connected between the first diversion block 301 and the second diversion block 302. The third sleeve 304 penetrates through a lower right part of the tank body 1, and the second cylinder 305 is hermetically connected between the second sleeve 303 and the third sleeve 304 in a sliding manner. The handle 306 is welded to a right side of the second cylinder 305, and the third cylinder 307 is inserted into an inner side of the second cylinder 305. The oxygen absorption bag 308 is placed on an inner side of the third cylinder 307, and the connecting block 309 is screwed to a left side of the third cylinder 307. The cleaning unit is connected to a left side of the connecting block 309. Multiple through holes 93 are formed in a left side of the third cylinder 307, and a third groove 94 is formed in a right lower part of the first diversion block 301.

The cleaning unit includes a connecting rod 3010 and a push block 3011. The connecting rod 3010 is welded to a left side of the connecting block 309, and the push block 3011 is welded to a left side of the connecting rod 3010.

When the air inside the tank body 1 is exhausted, a small amount of oxygen still remains in the tank body 1. At this time, the handle 306 is manually pulled to move to the right, the handle 306 drives the second cylinder 305 to move to the right, and the second cylinder 305 drives the third cylinder 307 to move to the right, thus making the third cylinder 307 far away from the second sleeve 303. The third cylinder 307 drives the oxygen absorption bag 308 away from the second sleeve 303. At this time, the oxygen absorption bag 308 is in contact with a gas in the tank body 1 through the through holes 93, so as to absorb and remove the oxygen from the tank body 1. Afterwards, the second cylinder 305 is pushed to move to the left to return to its original position. When in use, the oxygen absorption bag 308 absorbs and removes the oxygen from the tank body 1, thus preventing the oxygen from mixing with hydrogen and improving the safety performance.

Impurities on the surface of the hydrogen storage container body fall off onto the first diversion block 301, and slide to an included angle between the first diversion block 301 and the second cylinder 305 along the inclined plane. Then, the handle 306 is manually pulled to move to the right, the handle 306 drives the second cylinder 305 to move to the right, and the second cylinder 305 is pulled out to make the impurities continue to slide down to the middle of the first diversion block 301. In this process, the second cylinder 305 drives parts thereon to move, the connecting rod 3010 drives the push block 3011 to move to the right, and the push block 3011 pushes the impurities in the middle of the first diversion block 301 rightwards into the third groove 94, and then the second cylinder 305 and the parts thereon are far away from the tank body 1. Afterwards, the impurities collected in the third groove 94 are cleaned manually, the connecting block 309 is unscrewed to replace the oxygen absorption bag 308, then the connecting block 309 is reinstalled to the original position, and then the second cylinder 305 and parts thereon are reinstalled into the tank body 1. When in use, the oxygen absorption bag 308 can be conveniently replaced by pulling the second cylinder 305, when the oxygen absorption bag 308 is pulled out, the push block 3011 can be automatically linked to collect the impurities in the tank body into the third groove 94, and thus the difficulty of manually cleaning the impurities is reduced.

Finally, it should be noted that the above embodiments are only preferred embodiments of the present disclosure and are not intended to limit the present disclosure. Although the present disclosure has been described in detail with reference to above embodiments, those skilled in the art still can modify the technical solutions recorded in the above embodiments, or replace some technical features by equivalents. Any modification, equivalent replacement, improvement, etc. made within the spirit and principle of the present disclosure should be included in the scope of protection of the present disclosure.

What is claimed is:

1. An anti-leakage device for a hydrogen storage container, comprising a tank body (1), a top cover (2), a plurality of connecting rings (3), a hydrogen storage container body (4), a first pipeline (5), and a valve body (6), wherein the top cover (2) is fixedly connected to an upper side of the tank body (1), two connecting rings of the plurality of connecting rings (3) are fixedly connected to an inner side of the tank body (1); the hydrogen storage container body (4) is fixedly connected between the two connecting rings of the plurality of connecting rings (3); an upper side of the hydrogen storage container body (4) communicates with the first pipeline (5), and the valve body (6) is installed on the first pipeline (5); wherein the anti-leakage device further comprises an extension bar (7), a first sleeve (8), a hand wheel (9), a first sealing ring (10), a sealing assembly, and an impurity removing assembly; the first sealing ring (10) is fixedly connected between the tank body (1) and the top cover (2); a plurality of first grooves (91) are formed in each of the two connecting rings of the plurality of connecting rings (3) in an annular array; a flexible shaft of the valve body (6) is fixedly connected to the extension bar (7); the first sleeve (8) is fixedly connected to an upper left part of the tank body (1), and the first sleeve (8) is hermetically and rotatably connected to the extension bar (7); the hand wheel (9) is fixedly connected to a left side of the extension bar (7), the sealing assembly is connected to a right side of the tank body (1), the impurity removing assembly is connected to a lower side of the tank body (1), and the impurity removing assembly is connected to the sealing assembly.

2. The anti-leakage device for a hydrogen storage container according to claim 1, wherein the sealing assembly comprises a second pipeline (201), a third pipeline (202), a first cylinder (203), a piston unit, a fixing unit, a shunting unit, and a blocking unit; a right upper part of the tank body (1) communicates with the pipeline (201), the third pipeline (202) is hermetically connected to a right side of the second pipeline (201) in a sliding manner, the first cylinder (203) is fixedly connected to an inner right part of the second pipeline (201), the piston unit is connected to an inner side of the first cylinder (203), the fixing unit is arranged at an outer left part of the second pipeline (201), the shunting unit is connected to an inner left part of the second pipeline (201), and the blocking unit is connected to the shunting unit.

3. The anti-leakage device for a hydrogen storage container according to claim 2, wherein the piston unit comprises a linkage frame (204), a first linkage block (205), and a sealing sleeve (206); the linkage frame (204) is fixedly connected to an inner right part of the third pipeline (202), the first linkage block (205) is fixedly connected to a left end of the linkage frame (204), the sealing sleeve (206) is fixedly connected to an outer side of the first linkage block (205), and the sealing sleeve (206) is in contact with the first cylinder (203).

4. The anti-leakage device for a hydrogen storage container according to claim 3, wherein the fixing unit comprises a disc (207), a circular ring (208), a shift rod (209), a plurality of magnets (2010), a plurality of fixing blocks (2011), a fixing ring (2012), a plurality of second linkage blocks (2013), and a second sealing ring (2014); the disc (207) is fixedly connected to an upper right part of the tank body (1), and the disc (207) is located outside the second pipeline (201); the circular ring (208) is rotatably connected to a right side of the disc (207); the shift rod (209) is fixedly connected to a rear side of the circular ring (208); two magnets of the plurality of magnets (2010) are fixedly connected inside the circular ring (208), and one magnet of the plurality of magnets (2010) located below is magnetically connected to the shift rod (209); four fixing blocks of the plurality of fixing blocks (2011) are fixedly connected to an inner side of the circular ring (208) in an annular array; the fixing ring (2012) is fixedly connected to an outer left part of the third pipeline (202); four second grooves (92) are formed in the fixing ring (2012) in an annular array; four second linkage blocks of the plurality of second linkage blocks (2013) are fixedly connected to a right side of the fixing ring (2012) in an annular array; each of the four second linkage blocks of the plurality of second linkage blocks (2013) is provided with an inclined plane, and the second sealing ring (2014) is fixedly connected to an inner left part of the disc (207).

5. The anti-leakage device for a hydrogen storage container according to claim 4, wherein the shunting unit comprises a spacer (2015), a stopper (2016), a fourth pipeline (2017), and a fifth pipeline (2018); the spacer (2015) is fixedly connected to an inner left part of the second pipeline (201), the stopper (2016) is fixedly connected to a left side of the spacer (2015), and the stopper (2016) is fixedly connected to the second pipeline (201); the fourth pipeline (2017) penetrates through a middle part of the stopper (2016), and the fourth pipeline (2017) is fixedly connected to the tank body (1); the fifth pipeline (2018) communicates with a lower side of the fourth pipeline (2017), the fifth pipeline (2018) is fixedly connected to the tank body (1), and a plurality of round holes are formed in an upper side of the fifth pipeline (2018).

6. The anti-leakage device for a hydrogen storage container according to claim 5, wherein the blocking unit comprises a plurality of first filter screens (2019), and a second filter screen (2020); the plurality of first filter screens (2019) are fixedly connected between one connecting ring of the plurality of connecting rings (3) located above and the tank body (1) in an annular array; the fourth pipeline penetrates through an adjacent first filter screen of the plurality of first filter screens (2019); and the second filter screen (2020) is fixedly connected between a front side of the spacer (2015) and the second pipeline (201).

7. The anti-leakage device for a hydrogen storage container according to claim 6, wherein the impurity removing assembly comprises a first diversion block (301), a second diversion block (302), a second sleeve (303), a third sleeve (304), a second cylinder (305), a handle (306), a third cylinder (307), an oxygen absorption bag (308), a connecting block (309), and a cleaning unit; the first diversion block (301) is fixedly connected to a lower side of the tank body (1), and an upper side surface of the first diversion block (301) is V-shaped; the second diversion block (302) is fixedly connected to a lower left part of the tank body (1), and the second diversion block (302) is fixedly connected to the first diversion block (301); the second sleeve (303) is fixedly connected between the first diversion block (301) and the second diversion block (302); the third sleeve (304) penetrates through a lower right part of the tank body (1), and the second cylinder (305) is hermetically connected between the second sleeve (303) and the third sleeve (304) in a sliding manner; the handle (306) is fixedly connected to a right side of the second cylinder (305); the third cylinder (307) is inserted into an inner side of the second cylinder (305), the oxygen absorption bag (308) is placed on an inner side of the third cylinder (307), the connecting block (309) is screwed to a left side of the third cylinder (307), and the cleaning unit is connected to a left side of the connecting block (309).

8. The anti-leakage device for a hydrogen storage container according to claim 7, wherein the cleaning unit comprises a connecting rod (3010) and a push block (3011); the connecting rod (3010) is fixedly connected to a left side of the connecting block (309), and the push block (3011) is fixedly connected to a left side of the connecting rod (3010).

9. The anti-leakage device for a hydrogen storage container according to claim 8, wherein a plurality of through holes (93) are formed in a left side of the third cylinder (307).

10. The anti-leakage device for a hydrogen storage container according to claim 9, wherein a third groove (94) is formed in a right lower part of the first diversion block (301).

11. The anti-leakage device for a hydrogen storage container according to claim 7, wherein a plurality of through holes (93) are formed in a left side of the third cylinder (307).

12. The anti-leakage device for a hydrogen storage container according to claim 11, wherein a third groove (94) is formed in a right lower part of the first diversion block (301).

* * * * *